(12) United States Patent
Demsey

(10) Patent No.: US 11,562,404 B2
(45) Date of Patent: Jan. 24, 2023

(54) SYSTEMS AND METHODS FOR ONLINE AUCTION OF DIVERSE ELECTRONIC ADVERTISEMENTS

(71) Applicant: AOL Advertising Inc., New York, NY (US)

(72) Inventor: Seth Mitchell Demsey, Dulles, VA (US)

(73) Assignee: Yahoo Ad Tech LLC, Dulles (VA)

(*) Notice: Subject to any disclaimer, the term of this patent is extended or adjusted under 35 U.S.C. 154(b) by 927 days.

(21) Appl. No.: 13/829,019

(22) Filed: Mar. 14, 2013

(65) Prior Publication Data

US 2014/0279052 A1    Sep. 18, 2014

(51) Int. Cl.
*G06Q 30/02*    (2012.01)
*G06Q 30/08*    (2012.01)

(52) U.S. Cl.
CPC ......... *G06Q 30/0275* (2013.01); *G06Q 30/08* (2013.01)

(58) Field of Classification Search
CPC .. G06Q 30/02; G06Q 20/241; G06Q 30/0275; G06Q 30/08
USPC ................................................ 705/14, 14.45
See application file for complete search history.

(56) References Cited

U.S. PATENT DOCUMENTS

| | | | |
|---|---|---|---|
| 11,062,351 B1* | 7/2021 | Holtan ................ | G06Q 30/0251 |
| 2007/0150353 A1* | 6/2007 | Krassner ................ | G06Q 30/00 |
| | | | 705/14.64 |
| 2007/0156621 A1 | 7/2007 | Wright et al. | |
| 2009/0327032 A1 | 12/2009 | Gunawardana et al. | |
| 2010/0057558 A1* | 3/2010 | Yano ...................... | G06K 9/325 |
| | | | 705/14.45 |
| 2010/0198694 A1* | 8/2010 | Muthukrishnan ...... | G06Q 30/02 |
| | | | 705/14.71 |

OTHER PUBLICATIONS

Unnikrishnan Nair Dineshan, Method and System for Conducting Second Price Auctions for Maximizing Video Advertising Yield by Considering Success Rate in an Auction, Jan. 15, 2019, ip.com, p. 1 (Year: 2019).*

(Continued)

*Primary Examiner* — Michael Bekerman
*Assistant Examiner* — Darnell A Pouncil
(74) *Attorney, Agent, or Firm* — Bookoff McAndrews, PLLC

(57) ABSTRACT

Systems and methods are disclosed for executing an online auction of diverse online advertisements. One method includes receiving inventory information for serving ads on a publisher web page, the inventory information including at least a first ad configuration different from a second ad configuration, each of the first and second ad configurations defining one or both of an ad size and an ad attribute; receiving or generating a plurality of ad bids to serve ads in the first ad configuration and to serve ads in the second ad configuration; and awarding impressions to one or both of the bids to serve ads in the first ad configuration and the second ad configuration, in a proportion based at least in part on a revenue amount associated with the bids to serve ads in the first ad configuration and bids to serve ads in the second ad configuration.

16 Claims, 7 Drawing Sheets

(56) References Cited

OTHER PUBLICATIONS

International Search Report and Written Opinion for corresponding International Application No. PCT/US2014/25893, dated Oct. 3, 2014, 9 pages.
Extended European Search Report and Written Opinion, issued in corresponding International Application No. PCT/US2014/25893 dated Oct. 11, 2016 (6 pages).
International Preliminary Report on Patentability issued in corresponding International Application No. PCT/US2014/25893, dated Sep. 24, 2015.

* cited by examiner

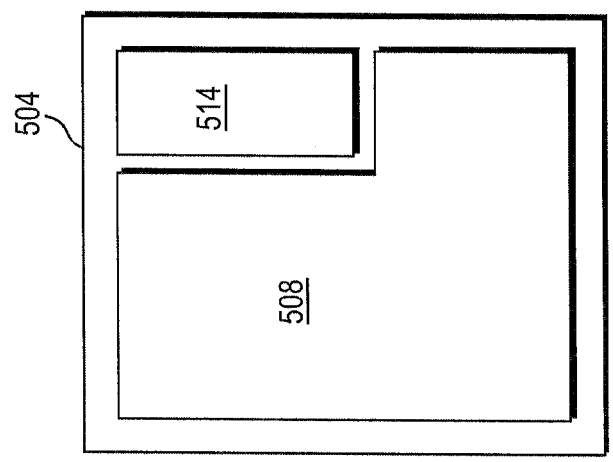
*FIG. 5C*
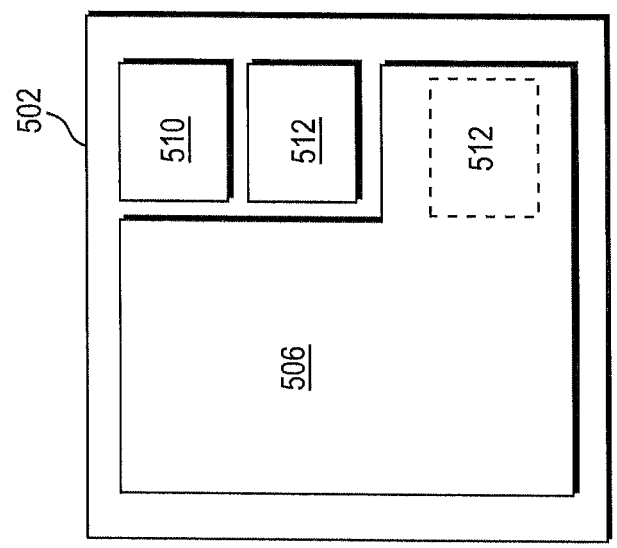
*FIG. 5B*
*FIG. 5A*

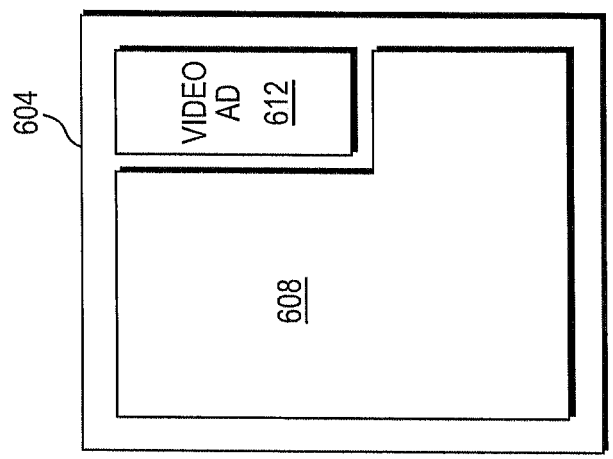
*FIG. 6C*
*FIG. 6B*
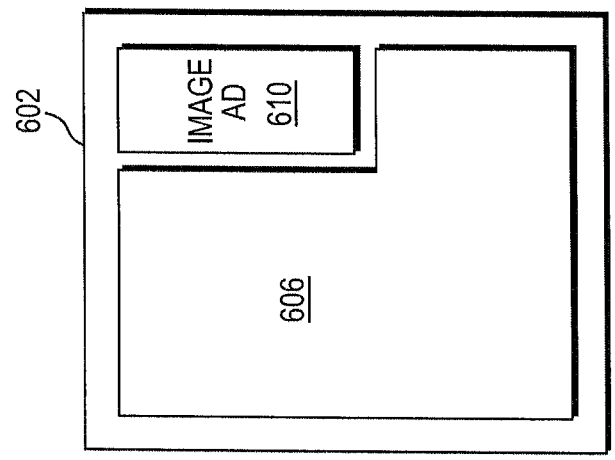
*FIG. 6A*

US 11,562,404 B2

SYSTEMS AND METHODS FOR ONLINE AUCTION OF DIVERSE ELECTRONIC ADVERTISEMENTS

TECHNICAL FIELD

Various embodiments of the present disclosure relate generally to managing online auctions of electronic advertisements. More specifically, exemplary embodiments of the present disclosure relate to systems and methods for managing auctions of diverse web and mobile advertisements over the Internet.

BACKGROUND

Internet advertisers often create online advertising campaigns that include numerous advertisements (e.g., "banner ads") designed to be placed on websites during a specified period of time. For example, a company may design several types or sizes of advertisements for a product, and may wish to have the advertisements placed on websites during the sale of the product. Each time one of these advertisements is shown to a website visitor is known as an "impression." When shown the advertisement, the user may select, or "click," on the advertisement or may take another "action" such as completing an online form to request more information. If the user later purchases the product, the purchase is referred to as a "conversion" of the impression.

Advertisers may be interested in impressions (e.g., if they are trying to increase awareness of a brand), clicks (e.g., if they are trying to provide more information about a product), or conversions (e.g., if they are trying to make sales or get new users to sign up for services). Advertisers may pay based on, for example, impressions, clicks, or conversions over the course of an advertising campaign. An advertiser may have a spending plan that specifies how the advertiser wishes to spend its budget during a campaign. For example, the advertiser may wish to spend money only on certain days during the campaign, or may wish to spend evenly over every day of the campaign. Each advertiser may have a daily budget (e.g., $1,000 per day) and/or a daily goal of impression volume (e.g., 1000 impressions per day), known as "daily delivery" or "pacing." Each advertiser may also desire an ad campaign to perform certain types of consumer targeting and/or achieve a particular distribution of advertisements across various websites ("spreading"). Moreover, an advertiser may desire to control which types and sizes of their ads are displayed.

As a result, various techniques are used to manage online ad delivery within and among advertising campaigns. In certain advertising networks, ad servers receive impression requests from publishers (e.g., websites or other entities with an inventory of online ad space). The ad servers may group ad requests from various advertising campaigns, e.g., according to impressions to be "targeted" based on a combination of attributes defined by the ad requests. In addition to targeting requirements, each ad request received from an advertiser generally includes a "bid price" and possibly a "bid allocation." The bid price is the amount of money offered by the ad request for placement of the targeted impression. The bid allocation, if present, is the ratio (e.g., point value from 0 to 1) of targeted inventory the ad campaign is willing to purchase at the bid price. The list of ads that target a certain impression request may be sorted in descending order according to their bid price, and then placed in groups such that the sum of their bid allocations equals 1. If the ad request with the highest bid price has a bid allocation of 1, or if the bid allocation does not exist, it will always win the impression. Such ad delivery methods ensure that the advertiser with an ad with the greatest expected value is able to purchase as much inventory as desired. These methods also reveal both the marginal value of the impression inventory (e.g., the cost required per impression), and the amount of volume (e.g., the number of impressions) purchased at each price.

In this type of competitive bidding marketplace, publishers typically auction their advertising inventory units based on a preset arrangement or layout designed for their web pages. For example, one publisher might plan for a blog page or news page to always be substantially filled with publishing content except for a "leaderboard" ad (e.g., having 728×90 pixels) at the top of a page, and a "wide skyscraper" ad (e.g., having 160×600 pixels) at the right-hand side of a page. Thus, that publisher might consistently submit requests for bids on those two ad formats each time the publisher's page is displayed. In some cases, a publisher might know that they have available advertising space that could fit, for example, either two "medium rectangle" ads (e.g., having 300×250 pixels) or one "half page" ad (e.g., having 300×600 pixels), but not both. In other words, the publisher might have to decide whether to request the display of two small ads each time the publisher's web page is displayed, or to request the display of one larger ad each time the page is displayed. This also may be true of ad attributes other than shape or size. For example, a publisher might have an ad cell on its page that could accommodate either a standard, image-type display ad, or a rich, e.g., video or flash-type ad. Again, the publisher might have to decide whether to request the display of a standard image-type display ad each time the publisher's web page is displayed, or to request the display of a rich, e.g., video or flash-type, ad each time the page is displayed.

This existing system is less than optimal for several reasons. First of all, the requirement for publishers to statically set the desired sizes and attributes of requested ads results in sub-optimal revenue yield. For example, at some particular time of the day, advertisers' bids may result in higher revenue for impressions of the two smaller ads, whereas at another time of day, advertisers' bids might result in higher revenue for impressions of the one larger ad. More generally, the existing regime results in less variety and selection available for advertisers to consider and purchase. While this lack of variety and selection ultimately expresses itself in lower revenue, it also has the effect of contributing to reduced satisfaction among advertisers. For instance, an advertiser might be interested in purchasing a very large volume of some particular size or type of advertisement, only to find that an online ad auction contains mostly impression requests for another type of ad.

Accordingly, a need exists for systems and methods for facilitating online auctions of diverse electronic advertisements. More specifically, a need exists for systems and methods for auctioning electronic advertisements having diverse sizes and attributes. The present disclosure is directed to improving the auction of web and mobile advertising by solving one or more of the above-mentioned challenges.

SUMMARY OF THE DISCLOSURE

According to certain embodiments, computer-implemented methods are disclosed for executing an online auction of diverse online advertisements. One method includes receiving, over a network, inventory information for serving ads on a publisher web page, the inventory information including at least a first ad configuration and a second ad configuration different from the first ad configuration, each of the first and second ad configurations defining an ad attribute; receiving, over the network, or generating, using a processor, a plurality of ad bids, the plurality of ad bids including bids to serve ads in the first ad configuration and bids to serve ads in the second ad configuration; receiving, over the network, or generating, using a processor, a plurality of ad requests, the plurality of ad requests including requests to serve ads on the publisher web page in the first ad configuration and requests to serve ads on the publisher web page in the second ad configuration; and awarding impressions to one or both of the bids to serve ads in the first ad configuration and the bids to serve ads in the second ad configuration, in a proportion based at least in part on a revenue amount associated with the bids to serve ads in the first ad configuration and bids to serve ads in the second ad configuration.

According to certain embodiments, systems are disclosed for executing an online auction of diverse online advertisements. One system includes a data storage device storing instructions for executing an online auction of diverse online advertisements; and a processor configured to execute the instructions to perform a method including: receiving, over a network, inventory information for serving ads on a publisher web page, the inventory information including at least a first ad configuration and a second ad configuration different from the first ad configuration, each of the first and second ad configurations defining an ad attribute; receiving, over the network, or generating, using a processor, a plurality of ad bids, the plurality of ad bids including bids to serve ads in the first ad configuration and bids to serve ads in the second ad configuration; receiving, over the network, or generating, using a processor, a plurality of ad requests, the plurality of ad requests including requests to serve ads on the publisher web page in the first ad configuration and requests to serve ads on the publisher web page in the second ad configuration; and awarding impressions to one or both of the bids to serve ads in the first ad configuration and the bids to serve ads in the second ad configuration, in a proportion based at least in part on a revenue amount associated with the bids to serve ads in the first ad configuration and bids to serve ads in the second ad configuration.

According to certain embodiments, a computer-readable medium is disclosed storing instructions that, when executed by a processor, cause the processor to execute an online auction of diverse online advertisements, including: receiving, over a network, inventory information for serving ads on a publisher web page, the inventory information including at least a first ad configuration and a second ad configuration different from the first ad configuration, each of the first and second ad configurations defining an ad attribute; receiving, over the network, or generating, using a processor, a plurality of ad bids, the plurality of ad bids including bids to serve ads in the first ad configuration and bids to serve ads in the second ad configuration; receiving, over the network, or generating, using a processor, a plurality of ad requests, the plurality of ad requests including requests to serve ads on the publisher web page in the first ad configuration and requests to serve ads on the publisher web page in the second ad configuration; and awarding impressions to one or both of the bids to serve ads in the first ad configuration and the bids to serve ads in the second ad configuration, in a proportion based at least in part on a revenue amount associated with the bids to serve ads in the first ad configuration and bids to serve ads in the second ad configuration.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 5A-5C are schematic diagrams reflecting an auction of diverse web and/or mobile advertisements over the Internet, according to an exemplary embodiment of the present disclosure;

FIGS. 6A-6C are schematic diagrams reflecting an auction of diverse web and/or mobile advertisements over the Internet, according to an exemplary embodiment of the present disclosure.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes systems and methods for online auctioning of diverse online advertisements, including web and mobile advertisements of various types, sizes, and attributes. According to embodiments of the present disclosure, an online auction may include a plurality of diverse configurations of ad cells requested by a publisher to be served with ads. As a result, even if a publisher has online area for only a subset of the plurality of possible ads, the publisher may receive bids on all of the possible ads, and award impressions to the subset of advertising bids that result in the highest revenue or other business goal. For example, if a publisher has online area for either one large ad or two small ads, the publisher may submit bid requests for both the one large ad, and bid requests for the two small ads, and award an impression to the arrangement that results in the highest revenue. Specifically, the publisher may ask or instruct a bidding controller or bidding exchange system to issue three bid requests (one for the larger ad, and two for the smaller ads), and then yield optimize to serve either the two small ads or one large ad based on the combined yield. In addition, if a publisher can provide ad cells that can be served with, for example, either rich media ad units or non-rich ad units, the publisher may instruct a bidding controller or bidding exchange system to issue two bid requests (one for the rich media ad, and one for the non-rich ad unit), and then yield optimize to serve either the rich media ad unit or non-rich ad unit based on the combined yield. Moreover, as will be described in more detail below, a bidding controller or bidding exchange system may create an auction and/or bid table comprising any combination of ads or ad configurations that could be served in a location of a publisher's web page. For example, the bidding controller or bidding exchange system may test demand and price sensitivity to an infinite number of possible ad configurations, to determine which ad configuration may generate the most revenue. For example, example, the bidding controller or bidding exchange system might create a bidding table causing large non-rich media to compete against small, rich media ads, or large interactive ads to compete against medium-sized video ads, and so on.

Figure 1:
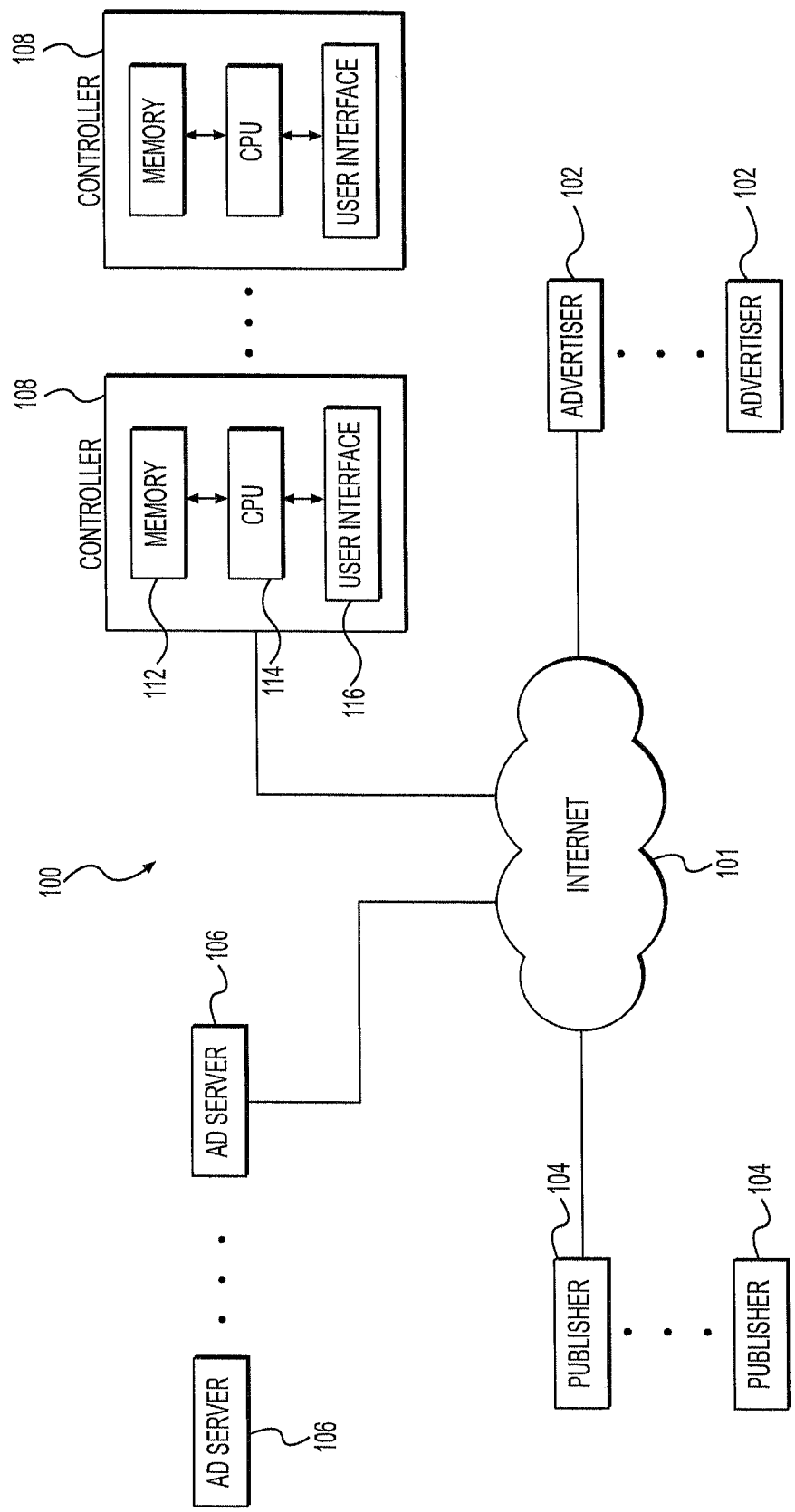
FIG. 1 is a schematic diagram of an environment in which electronic advertising may be performed and a system for managing auctions of electronic advertising, according to an exemplary embodiment of the present disclosure.

FIG. 1 illustrates an exemplary environment 100 for implementing online advertising auctions. System 100 may include a plurality of advertisers 102, publishers 104, ad servers 106, and controllers 108, in communication with the Internet 101. Advertisers 102 may include any entities having online advertisements (e.g., banner ads, display ads, rich media ads, pop-ups, etc.) desired to be displayed to online users. Advertisers 102 may interact with publishers 104, ad servers 106, and/or controllers 108 through computers connected to the Internet 101. Thus, advertisers 102 may be able to communicate advertising information, such as ad information, ad sizes, targeting information, consumer information, budget information, bidding information, etc., to other entities in environment 100.

Publishers 104 may include any entities having inventories of available online advertising space. For example, publishers 104 may include online content providers, search engines, e-mail programs, or any entity or program having online user traffic. Publishers 104 may interact with advertisers 102, ad servers 106, and/or controllers 108 via computers connected to the Internet 101. Thus, publishers 104 may be able to communicate inventory information, such as site information, content layout, ad layout, available ad sizes and spaces, visitor demographic information, cost information, etc., to other entities in environment 100.

Ad servers 106 may include any type of servers configured to process advertising information from advertisers 102 and/or inventory information from publishers 104, either directly or indirectly. In certain embodiments, ad servers 106 may be remote web servers that receive advertising information from advertisers 102 and serve ads to be placed by publishers 104. Ad servers 106 may be configured to serve ads across various domains of publishers 104, for example, based on advertising information provided by advertisers 102. Ad servers 106 may also be configured to serve ads based on contextual targeting of web sites, search results, and/or user profile information. In some embodiments, ad servers 106 may be configured to serve ads based on information and instructions received from controllers 108.

Controllers 108 may include one or more computing systems configured to receive information from entities in environment 100, process the information, and generate instructions for executing an auction of diverse ads, according to methods described herein. Controllers 108 may include any type or combination of computing systems, such as clustered computing machines and/or servers. In one embodiment, each controller 108 may be an assembly of hardware, including a memory 112, a central processing unit ("CPU") 114, and/or a user interface 116. Memory 112 may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. CPU 114 may include one or more processors for processing data according to instructions stored in the memory. The functions of the processor may be provided by a single dedicated processor or by a plurality of processors. Moreover, the processor may include, without limitation, digital signal processor (DSP) hardware, or any other hardware capable of executing software. User interface 116 may include any type or combination of input/output devices, such as a display monitor, keyboard, and/or mouse.

Figure 2:
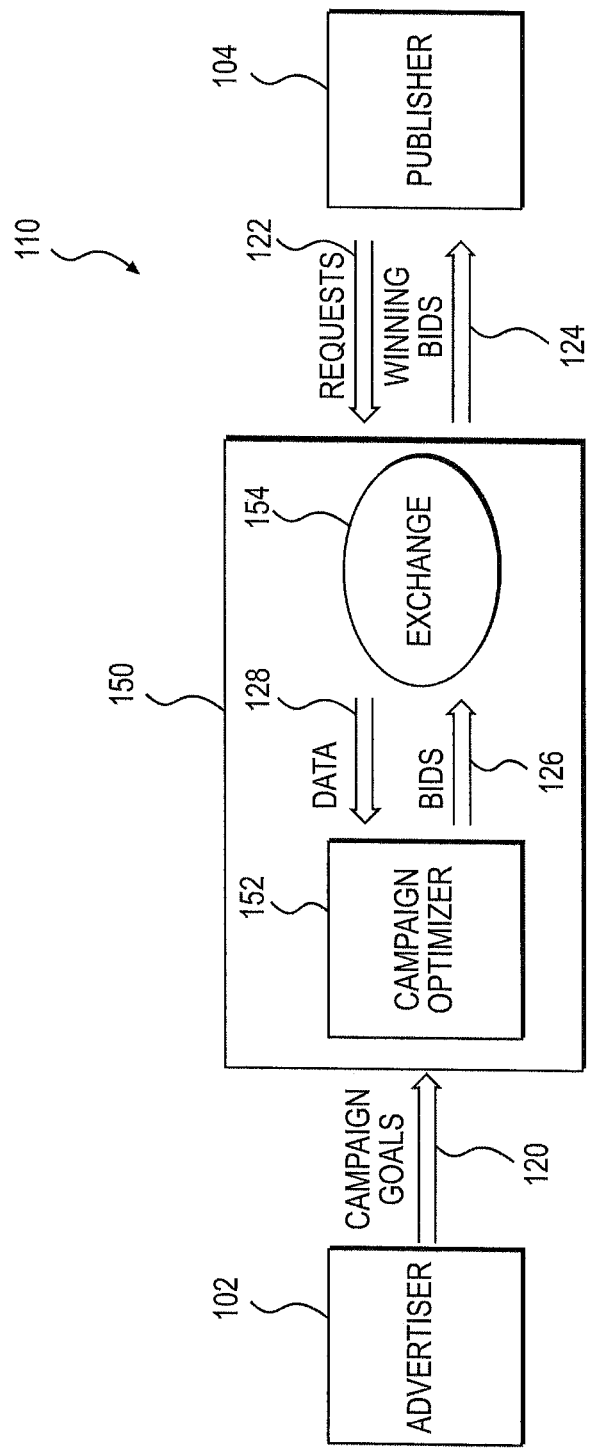
FIG. 2 is a diagram of information flow between entities involved in online auctions of web and mobile advertisements, according to an exemplary embodiment of the present disclosure.

FIG. 2 shows a block diagram of a process flow for providing an electronic marketplace for auctioning diverse advertising inventory consistent with an embodiment of the present invention. Marketplace 110 may include advertiser 102, campaign optimizer 152, exchange 154, and publisher 104. In one embodiment, campaign optimizer 152 and/or exchange 154 may be executed on one or more servers operated, for example, by an advertising network 150, or any other type of programmatic buyer. Advertiser 102 may have an advertising campaign and wish to purchase one or more cells on a web page to display the campaign advertisements. A "cell" may correspond to a slot for placing a particular advertisement at a particular place and time. For example, a slot for presenting a clickable Internet advertisement for a product or service (the particular ad) on a client's Internet browser (a particular network segment) may correspond to a cell. An impression may occur when the advertisement is placed in a cell and presented at the particular place and time. Each cell may be part of a campaign of cells, or an advertising campaign.

Further, as part of its advertising campaign, advertiser 102 may develop one or more campaign goals 120. A campaign goal may describe one or more metrics, such as profitability and cost that are to be maximized or minimized during the campaign. A campaign goal may include a list of delivery terms for the campaign to indicate preferences and/or tolerances of advertiser 102. For example, advertiser 102 may include a delivery term to instruct that no more than $1,000 per month should be expended during the advertising campaign. Advertiser 102 also may desire to set a proportion of delivery or impressions between one more ad sizes or layouts, as well as a proportion of delivery or impressions between rich media ads vs. non-rich media ads.

Advertiser 102 may send campaign goals 120 to campaign optimizer 152. Campaign optimizer 152 may use campaign goals 120 to formulate a bidding strategy for the advertising campaign. For example, campaign optimizer 152 may use campaign goals 120 to determine the web pages or types of web pages to target for placing advertisements.

The group of targeted web pages for an advertising campaign by advertiser 102 may be referred to as a target inventory. Bids 126 may identify the target inventory by listing specific web pages and/or ad cells, and/or by describing the page characteristics of the types of web pages on which advertiser 102 would like to place advertisements. Bids 126 may also be grouped by ad configuration, such as ad size or attribute. The page characteristics may include, for example, statistics regarding the viewers of the web page and the number of times the web page is loaded. As part of the bidding process, campaign optimizer 152 may repeatedly or continually submit bids 126 to exchange 154. A bid 126 may describe the target inventory of web pages for the advertising campaign as well as specify the maximum price per advertising request and the maximum request volume that advertiser 102 desires for the advertising campaign.

Publisher 104 may control inventory on one or more web pages that are available for displaying advertisements. Publisher 104 may send requests 122 to exchange 154 to inform exchange 154 of the available inventory. Publisher 104 may list inventory sizes and layouts, including the diverse ad configurations that the publisher's web page, or inventory may accommodate. Further, publisher 104 may maintain statistics and demographic data regarding the web pages containing the available inventory. For example, publisher 104 may maintain statistics regarding the average number of impressions per hour, for each hour of the day, that were created in the past week on a web page containing the available inventory.

Further, publisher 104 may include usage information within request 122, such as a base price for the inventory on a web page, below which publisher 104 is unwilling to vend the inventory. The usage information may also indicate an advertising period [0, T], which represents the period of time advertisements are to be placed in the inventory. Further, in some embodiments, publisher 104 may indicate that an advertisement may be removed from a web page before the end of the advertising period. Publisher 104 may provide the ad configuration, statistical, demographic, and usage data to exchange 154 as part of request 122. Additionally, the data from publisher 104 may be used by campaign optimizer 152 to formulate future bids.

Exchange 154 may facilitate the placement of advertisements from advertiser 102 onto cells provided by publisher 104 by matching bids 126 with requests 122. When a request 122 for advertising space arrives from publisher 104, exchange 154 may identify all bids 126 that have listed the web page of the publisher's request 122 within a target inventory. Exchange 154 may then choose the winning bids that will receive at least some of the advertising space offered by request 122. Exchange 154 may continuously receive requests 122 from publisher 104 and match requests 122 to bids 126. Finally, exchange 154 may notify advertiser 102 and publisher 104 of the winning bids 124. Further, exchange 154 may provide data 128 to campaign optimizer 152 and advertiser 102. For example, exchange 154 may include the demographic and statistical data received from publisher 104 as part of data 128. As will be described in more detail below, exchange 154 may award impressions based on various business rules, control parameters, or metrics, so as to select and match requests and ads that maximize yield.

Figure 3:
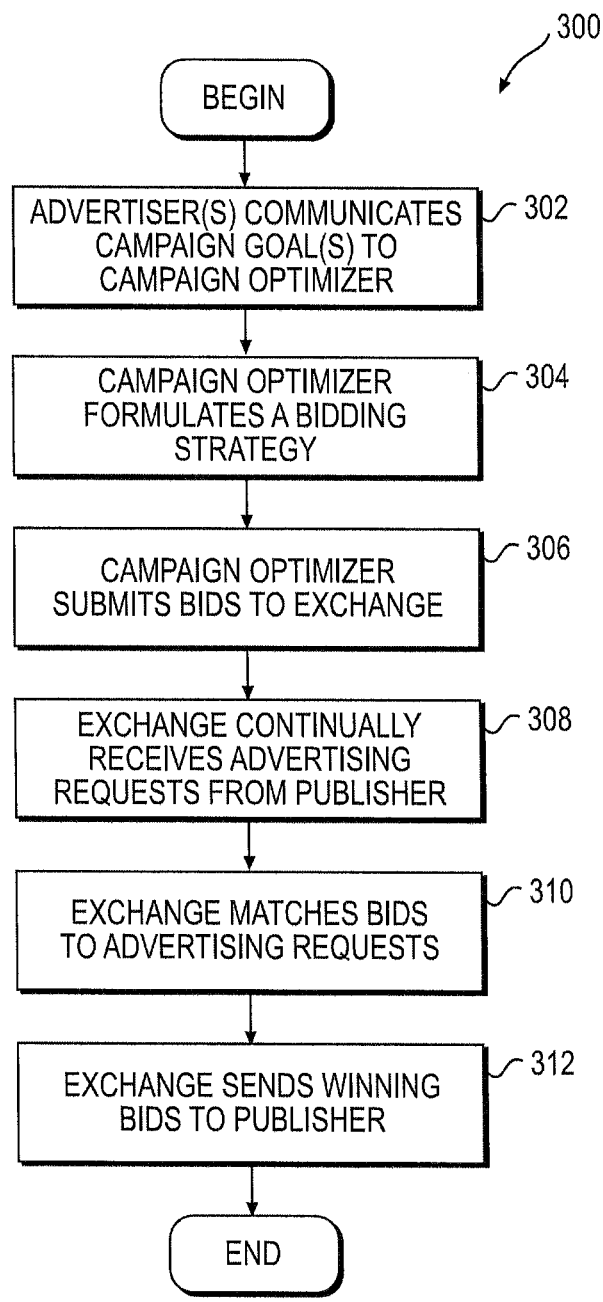
FIG. 3 is a flow diagram of an exemplary method for managing auctions of diverse web and mobile advertisements over the Internet, according to an exemplary embodiment of the present disclosure.

FIG. 3 is a flowchart of an advertising exchange system consistent with embodiments of the present invention. At step 302, advertiser 102 may communicate a campaign goal for at least one advertising campaign to campaign optimizer 152. A campaign goal may define its associated advertising campaign by setting one or more advertiser-specified target variables for the associated advertising campaign. An advertising campaign, then, may be thought of as a set of user-specified campaign goals related to a particular advertisement or set of advertisements. Target variables may be any combination of, e.g., advertising publication, publication type, ad configurations, cell sizes, connection speed, browser type, geographic region of the connection's IP address, industry, seasonal or other calendar or time restraints, proprietary data, or any other distinguishing feature. For example, advertisements may be limited such that a user will only observe an advertisement twice or three times a day. Target variables may also be based on type of content of an advertising space, or demographic information, such as gender, age, and income. Such variables may belong to advertising spaces, advertisements, advertisers, publishers, ends users, and/or other parties.

At step 304, campaign optimizer 152 may formulate a bidding strategy for each advertising campaign of advertiser 102 by creating bids to be submitted to an exchange 154. A bid may combine advertiser-specified target variables with optimization target variables designed to maximize efficiency and profitability of the advertising exchange service. For example, a bid may consist of a description of target variables desired, a maximum price advertiser 102 may be willing to pay for each advertisement displayed in an advertising space, and the maximum request volume advertiser 102 may be willing to buy for the bid. In some embodiments, the maximum request volume may be a percentage of all available advertising spaces matching the bid variables. In other embodiments, the maximum request volume may be represented differently, e.g., as a total number of advertising requests in a specified period of time.

At step 306, campaign optimizer 152 may submit bids to exchange 154. In certain embodiments, the bids may be submitted continuously. At step 308, exchange 154 may continually receive advertising requests from a publisher 104. An advertising request may specify a particular advertising space or a group of advertising spaces available to be matched with an advertisement or advertisements. According to embodiments of the present disclosure, a publisher's advertising requests may include a plurality of requests to serve ads on the publisher web page in a first ad configuration and a plurality of requests to serve ads on the publisher web page in a second ad configuration. For example, the publisher may request bids to serve ads in any desired configuration possible on the publisher's web page, such as different sizes, layouts, media type, capabilities, features (e.g., animation, pop-ups, roll-overs, etc.) In one embodiment, a publisher may issue a plurality of ad requests including requests to serve ads on the publisher web page in the first ad configuration and requests to serve ads on the publisher web page in the second ad configuration, where the first ad configuration includes one ad unit of a first size and the second ad configuration includes two ad units, each of a second size.

At step 310, exchange 154 may match bids from campaign optimizer 152 with advertising requests from publisher 104 based on target variables found in the bids and the actual variables associated with advertising requests. At step 312, exchange 154 may send winning bids to publisher 104. In some embodiments, step 312 may include the publisher communicating information about the advertisement associated with a winning bid. Publisher 104 may then retrieve the selected advertisement from its own server or another location. In other embodiments, step 312 may include sending the winning advertisements themselves to publisher 104.

In some embodiments, advertiser 102 may manage some or all of its own bids and communicate directly with exchange 154 and/or publisher 104 with respect to bids for one or more of its advertising campaigns. In other embodiments, exchange 154 may use any algorithm suitable for selecting one or more winning advertisements from a plurality of advertisement bids for a plurality of requests to fill advertising spaces.

Figure 4:
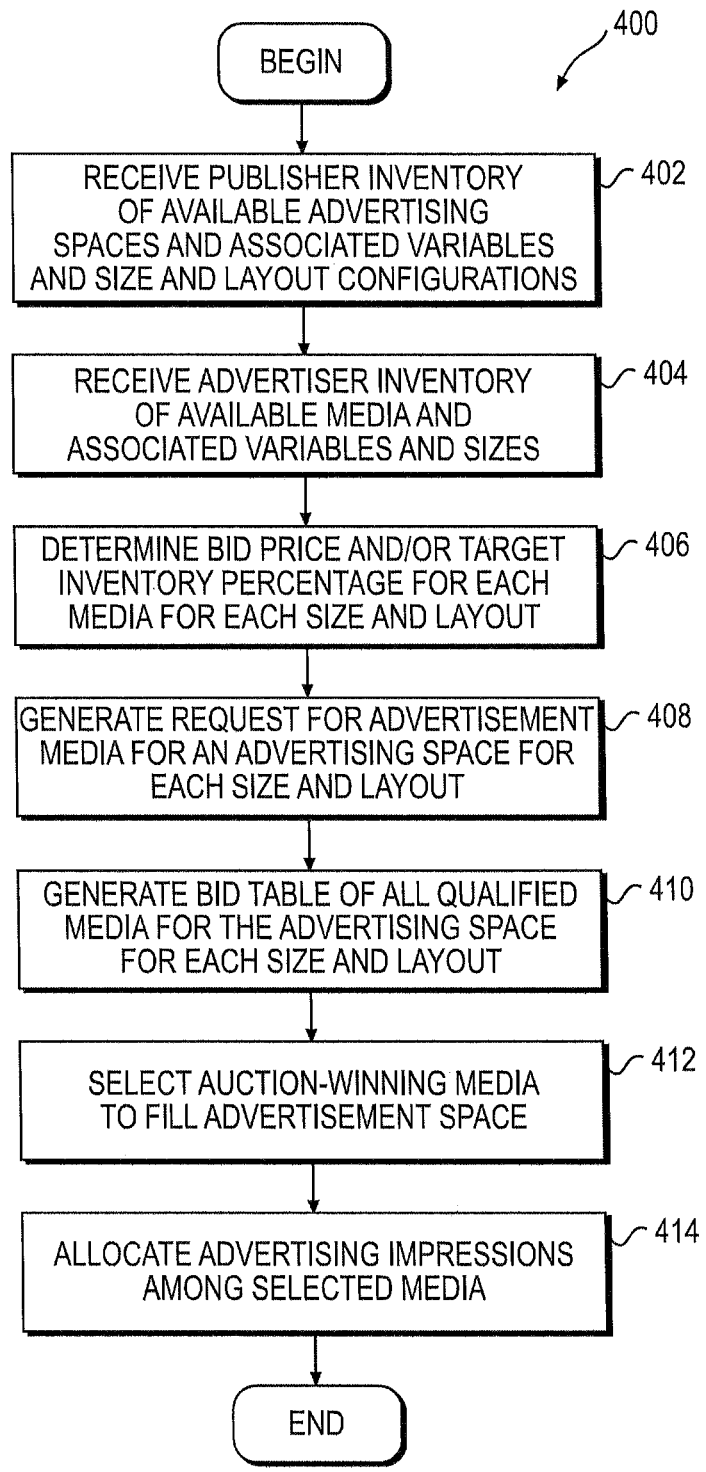
FIG. 4 is a flow diagram of an exemplary method for managing auctions of diverse web and mobile advertisements over the Internet, according to an exemplary embodiment of the present disclosure.

FIG. 4 is a flowchart of a method for auctioning diverse electronic advertisements consistent with embodiments of the present disclosure. At step 402, an advertising system may collect an inventory of advertising spaces (i.e., cells) and associated variables. In order to facilitate allocating advertisements among advertising spaces or cells, it may be desirable to collect information about publishers' inventory based on observable variables. For example, variables may be any combination of advertising publication, publication type, connection speed, browser type, geographic region of the connection's IP address, industry, seasonal or other calendar or time restraints, or any other distinguishing feature. Such variables may be attributes of advertising spaces, advertisements, advertisers, publishers, end users, and/or other parties. In one embodiment, the advertising system may collect information about publishers' available content layouts, ad layouts, ad sizes, and various combinations thereof.

Referring again to FIG. 4, at step 404, the advertising system may collect advertisements from advertisers. These advertisements may have associated target variables and sizes, as described above. For example, in one embodiment, advertisers may submit various types and sizes of ads, such as any ad formats endorsed and promoted by the Internet Advertising Bureau ("IAB"). As discussed above, an advertiser may target a variable only if the variable is public or if the advertiser has permission to access that variable. In some embodiments, advertisers may submit different combinations of variables with the same advertisement, and the system may treat each advertisement variable combination as a discrete advertisement.

At step 406, in one embodiment, a bid price and a target inventory percentage may be determined for each submitted advertisement based on the advertisement's associated target variables. The bid price may be the maximum price the advertiser of a particular advertisement is willing to pay for each advertising request. The target inventory percentage may be the maximum percentage of inventory that matches the variables that the advertiser is willing to purchase. In some embodiments, for an advertisement in inventory to be considered to match a set of variables, the advertisement must match all target variables. In other embodiments, an advertisement may be considered a match if it matches a single target variable or a defined percentage of target variables. In some embodiments, the bid price and/or target inventory percentage may be determined by the campaign optimizer 152 and/or controllers 108, as described above. In some embodiments, the bid price and/or target inventory percentage may be calculated using algorithms that utilize data collected by the system about the success and value of previous advertising campaigns and advertisements. In other embodiments, the advertiser may submit the bid price and/or target inventory percentage for a particular advertisement, thus reducing or eliminating the necessity for the system to calculate those numbers at step 406.

At step 408, the system may receive a request from a publisher for an advertisement to fill a specified advertising space. For example, as described above, the publisher may request to fill advertising space in a plurality of different configurations. For example, the publisher may request to have its web page served with advertisements in both a first size and a second size, or in both a first image type and a second type, or in both a first media type and a second media type, or in both a first layout and a second layout, and so on. Moreover, the publisher may request to have its web page served with ads having different combinations of sizes and features. For instance, the publisher may request to be served with the highest yielding ads among a competition of small rich ads vs. large static ads, or small interactive ads vs. medium-size video ads, and so on. In order to fill the request, the system identifies all qualified advertisements, e.g., those advertisements whose target variables match the variables of the specified advertising space. The system may then generate a bid table listing all qualified advertisements, ranked in descending order according to bid price (step 410). In one embodiment, the bid table may include two or more of the ad configurations requested to be served by the publisher.

Examples of such bid tables according to embodiments of the present invention are shown in FIGS. 5-7. The bid table may include an advertisement and a bid price for each advertisement. The advertisement may include an identifier used to uniquely identify each advertisement available in the system. In other embodiments, the bid table may incorporate other variables and/or qualified advertisements may be ranked according to variables other than bid price.

Referring again to FIG. 4, in some embodiments, advertisements may be selected from the top of the bid table at step 412 one-by-one until the sum of the target inventory percentages of the selected advertisement is equal to or greater than 100%. In some embodiments, if two or more advertisements have the same bid price and the addition of any one of such advertisements would cause the sum target inventory percentage of selected advertisements to be greater than or equal to 100%, all such advertisements become selected advertisements.

In some embodiments, impressions for the specified advertising space may then be allocated at step 414. In certain embodiments, advertisements may be allocated randomly among selected advertisements without regard to the target inventory percentage for each advertisement. In other embodiments, impressions for the specified advertising space are allocated in proportion to the target inventory percentage for each selected advertisement, with the last-selected advertisement receiving only the percentage required for the total sum of inventory percentages of selected advertisements to equal 100%.

In one embodiment, for each impression, the advertiser may be charged at the maximum bid price for the selected advertisement, meaning that the cost of placing an advertisement in the same advertising space may differ by each impression according to the advertisement being displayed. In some embodiments, the ordering of advertisements according to bid price or any other variable may be carried out continuously or at any time during the process of FIG. 4, for example, before a request is received from a publisher in step 408.

In some embodiments, further controls may be implemented that may affect the allocation of impressions among selected advertisements. Variables of advertisers or advertising spaces may limit advertisements based on a nearly infinite variety of categories. For example, a publisher may limit the percentage of impressions that may be filled by a single advertiser or a single advertisement. Such a limit may be implemented, for example, by publisher, by advertising space, by web page, and/or by a time period, among other variables.

FIGS. 5A-5C are schematic diagrams reflecting an auction of diverse web and/or mobile advertisements over the Internet, according to an exemplary embodiment of the present disclosure. Specifically, FIG. 5A depicts a publisher's web page 502, including a content area 506, where the publisher may display text, images, videos, or any other web content consistent with the publisher's publishing interests. Because of the shape or layout of content area 506, the publisher's web page 502 might have a space for two relatively small ads 510, 512. For example, the publisher's web page 502 might have room for two 300×250 pixel ad units.

Alternatively, as shown in FIG. 5B, the publisher might design and publish an alternative layout web page 504. As shown in FIG. 5B, the publisher's web page 504 might still have a content area 508 that is similar in size and content to content area 506. However, web page 504 may be configured for one relatively larger ad 514. For example, the publisher's web page 504 might be configured to be served with one 300×600 pixel ad unit. As discussed above, traditionally, a publisher might have been forced to pick between the layout of web page 502 and the layout of web page 504, and request bids only on the ad(s) associated with the selected layout. However, according to aspects of the present disclosure, the publisher may submit requests for bids on both (i) the combination of two small ads 510, 512, and (ii) the one larger ad 514. Thus, as shown in FIG. 5C, either the publisher 104 or exchange 154 (executed by ad servers 106 and/or controllers 108) may generate a bid table 516, including requests for bids on each of ads 510, 512, 514. In one embodiment, the exchange 154 (executed by ad servers 106 and/or controllers 108) may implement certain control parameters or business rules. For example, exchange 154 may ensure that bids are received or generated for either the larger ad 514, or both of the smaller ads 510, 512, to ensure that web page layout 502 is not displayed with only one of the smaller ads 510, 512. It should be appreciated that the smaller ads 510, 512 need not be positioned in the same place as where the one larger ad 514 would have been placed. For example, the smaller ad 512 may alternatively be positioned in the location reflected in dashed lines. In other words, while the configurations of FIGS. 5A and 5B may be alternatives that compete against each other in bidding, they may in some embodiments have ads covering differing locations and/or amounts of area.

Similarly, FIGS. 6A-6C are schematic diagrams reflecting an auction of diverse web and/or mobile advertisements over the Internet, according to another exemplary embodiment of the present disclosure. Specifically, FIG. 6A depicts a publisher's web page 602, including a content area 606, where the publisher may display text, images, videos, or any other web content consistent with the publisher's publishing interests. Based on the shape or layout of content area 606, the publisher's web page 602 might have space for an image ad 610. For example, the publisher's web page 602 might have space for one 300×600 pixel ad comprising a static image that a user could click through to a landing page, by clicking anywhere on the static image.

Alternatively, as shown in FIG. 6B, the publisher might desire to publish a web page 604 having a content area 608 that is similar in size and content to content area 606, but instead offer the advertising space for bids on a rich media ad, such as video ad 612. For example, the publisher may desire to solicit bids on advanced ads that have various Flash-enabled features, roll-over features, pop-up features, diverse click responses, etc. As discussed above, traditionally, a publisher might have been forced to pick between soliciting bids only on either image ads 610 or rich media, e.g., video ads 612. However, according to aspects of the present disclosure, the publisher may submit requests for bids on both image ads 610 and rich media, e.g., video ads 612. Thus, as shown in FIG. 6C, either the publisher 104 or exchange 154 (executed by ad servers 106 and/or controllers 108) may generate a bid table 614, including requests for bids on each of image ads 610 and rich media, e.g., video ads 612. In one embodiment, the exchange 154 (executed by ad servers 106 and/or controllers 108) may implement certain control parameters or business rules. For example, exchange 154 may adjust bid prices B1, B2, or related bid allocation values to ensure that image ads 610, and/or video ads 612 are displayed in a proportion that maximizes revenue and/or satisfies one or more of the publisher's and advertisers' goals.

Figures 7A, 7B:
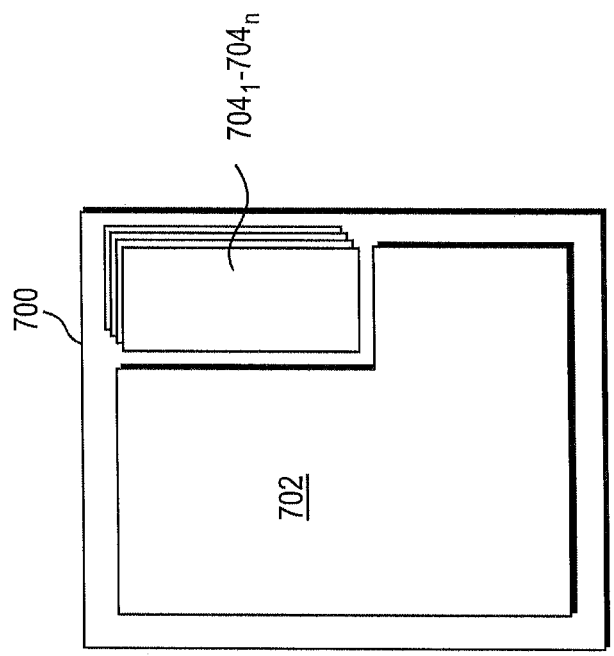
FIGS. 7A and 7B are schematic diagrams reflecting an auction of diverse web and/or mobile advertisements over the Internet, according to an exemplary embodiment of the present disclosure.

FIGS. 7A and 7B are schematic diagrams reflecting an auction of diverse web and/or mobile advertisements over the Internet, according to an exemplary embodiment of the present disclosure. Specifically, FIG. 7A depicts a publisher web page 700 including a content area 702, where the publisher may display text, images, videos, or any other web content consistent with the publisher's publishing interests. Web page 700 may also include an area for displaying one or more different advertisement configurations $704_1$ through $704_n$. That is, web page 700 may be configured to receive and display any desired type or combination of ad configurations $704_1$-$704_n$. In one embodiment, each ad configuration 704 may include a different sized ad or combination of sizes of ads. For example, one ad configuration 704 may include space for one ad unit, whereas another ad configuration 704 may include space for two or more ad units. It should be appreciated that the ad configuration 704 need not be limited to the position shown with respect to content 702. For example, any ad configuration 704 may actually interspersed with content 702, such as including one or more smaller ads positioned anywhere on web page 700, optionally in and among content 702. In one embodiment, each ad configuration 704 may be a different type of standardized ad unit, the specifications of which may be managed by the Internet Advertising Bureau. For example, each ad configuration 704 may facilitate advertising using a different type of ad format, such as a standardized image, a video, a Flash display, a pop-up, a roll-over animation, a game, an interactive user interface, HTML5, or any other rich ad execution.

As described above, the exchange 154 and/or controllers 108 may use the various ad configurations $704_1$-$704_n$ made available by the publisher of web page 700, and place them into a bid table, such as the bid table of FIG. 7B. Even though the ad configurations $704_1$-$704_n$ may be coextensive over the same area of the web page 700, they may each be placed into a bid table to cause advertiser bidding on each of the possible ad configurations. Thus, publisher 700 may determine which ad configuration provides the highest yield, subject to various delivery parameters or business rules, and instruct exchange 154 and/or controllers 108 to allocate delivery of impressions among ad configurations $704_1$-$704_n$ so as to maximize yield. Moreover, in one embodiment, business rules may be layered, to allow advertisers and/or publishers to frequency cap the number of impressions served for one particular ad configuration over another.

As described above, the increased diversity and selection of available ad configurations may improve advertiser satisfaction and improve revenue, by maximizing yield obtained across multiple possible ad configurations. For example, the diversity of ad configurations may help to increase overall bid density and therefore yield for publishers. Moreover, both bid density and premium bid prices for larger, more featured ad units may drive yield up, as well as availability of more premium ad units for advertisers to bid on.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for executing an online auction of diverse online advertisements ("ads"), the method including:
    receiving, by a processor of an advertising network server over a computer network, a plurality of ad requests from a processor of a publisher server, the plurality of ad requests including variables for serving online ads on a publisher web page, the variables including (i) one or more of: a geographic region, an advertising publication, a publication type, a browser type, and a temporal parameter, and (ii) at least a first ad configuration and a second ad configuration, wherein the first ad configuration is associated with a sub-region of the publisher web page and defines a first ad unit of a first pixel size, wherein the second ad configuration is also associated with and is coextensive over the sub-region of the publisher web page, wherein the second ad configuration is different from the first ad configuration, wherein the second ad configuration defines each of a second ad unit and a third ad unit of a second pixel size, wherein the first pixel size is different from the second pixel size, each of the first ad configuration and the second ad configuration defining an ad attribute;
    receiving, by the processor of the advertising network server over the computer network, a plurality of ad bids from a processor of an advertiser server, the plurality of ad bids including bids to serve ads in the first ad configuration and bids to serve ads in the second ad configuration, each of the plurality of ad bids including target variables, the target variables including one or more ad configurations, one or more cell sizes, and one or more of the variables for serving online ads on the publisher web page;
    matching, by the processor of the advertising network server, the plurality of ad requests to the plurality of ad bids based on the variables of the plurality of ad requests and the target variables to identify a portion of the plurality of ad bids that satisfies the variables of the plurality of ad requests;
    determining, by the processor of the advertising network server, a bid price for each ad associated with the portion of the plurality of ad bids;
    generating, by the processor of the advertising network server, a table that lists ads associated with the portion of the plurality of ad bids in descending order based on the respective determined bid price;
    determining, by the processor of the advertising network server, based on the generated table, which of the ad bids, of the portion of the plurality of ad bids, maximize yield by applying one or more control parameters; and
    selecting, by the processor of the advertising network server, one or more ad bids, of the portion of the plurality of ad bids, to serve ads in the first ad configuration and to serve ads in the second ad configuration, based at least in part on the determination of the ad bits that maximize yield.

2. The computer-implemented method of claim 1, further comprising:
    generating one ad request for the first ad unit of the first pixel size; and generating two ad requests for the second ad unit and the third ad unit of the second pixel size.

3. The computer-implemented method of claim 1, wherein the first ad configuration includes a first combination of ad units, and the second ad configuration includes a second combination of ad units.

4. The computer-implemented method of claim 1, wherein the first ad configuration includes a rich media ad unit, and the second ad configuration includes a non-rich media ad unit.

5. The computer-implemented method of claim 1, wherein the publisher web page is configured to display advertising in either the first ad configuration or the second ad configuration each time it is displayed on a web browser.

6. The computer-implemented method of claim 1, further comprising:
    generating an auction item for each of the first ad configuration and the second ad configuration; and
    executing an online auction to award an impression to a bid to serve an ad in the first ad configuration or a bid to serve an ad in the second ad configuration.

7. The computer-implemented method of claim 6, wherein the bids to serve ads in the first ad configuration are received in combination with a first bid price, and the bids to serve ads in the second ad configuration are received in combination with a second bid price.

8. The computer-implemented method of claim 7, further comprising:
    calculating a first aggregate revenue amount based on the first bid price; and
    calculating a second aggregate revenue amount based on the second bid price.

9. A system for executing an online auction of diverse online advertisements, the system including:
    a data storage device storing instructions for executing an online auction of diverse online advertisements; and
    a processor of an advertising network server, the processor configured to execute the instructions to perform operations including:
        receiving, over a computer network, a plurality of ad requests from a processor of a publisher server, the plurality of ad requests including variables for serving online ads on a publisher web page, the variables including (i) one or more of: a geographic region, an advertising publication, a publication type, a browser type, and a temporal parameter, and (ii) at least a first ad configuration and a second ad configuration, wherein the first ad configuration is associated with a sub-region of the publisher web page and defines a first ad unit of a first pixel size, wherein the second ad configuration is also associated with and is coextensive over the sub-region of the publisher web page, wherein the second ad configuration is different from the first ad configuration, wherein the second ad configuration defines each of a second ad unit and a third ad unit of a second pixel size, wherein the first pixel size is different from the second pixel size, each of the first ad configuration and the second ad configuration defining an ad attribute;

receiving, over the computer network, a plurality of ad bids from a processor of an advertiser server, the plurality of ad bids including bids to serve ads in the first ad configuration and bids to serve ads in the second ad configuration, each of the plurality of ad bids including target variables, the target variables including one or more ad configurations, one or more cell sizes, and one or more of the variables for serving online ads on the publisher web page;

matching the plurality of ad requests to the plurality of ad bids based on the variables of the plurality of ad requests and the target variables to identify a portion of the plurality of ad bids that satisfies one or more variables associated with the plurality of ad requests;

determining a bid price for each ad associated with the portion of the plurality of ad bids;

generating a table that lists ads associated with the portion of the plurality of ad bids in descending order based on the respective determined bid price;

determining, based on the generated table, which of the ad bids, of the portion of the plurality of ad bids, maximize yield by applying one or more control parameters; and selecting one or more ad bids, of the portion of the plurality of ad bids to serve ads in the first ad configuration and to serve ads in the second ad configuration, based at least in part on the determination of the ad bids that maximize yield.

10. The system of claim 9, wherein the operations further includes:
generating one ad request for the first ad unit of the first pixel size; and
generating two ad requests for the second ad unit and the third ad unit of the second pixel size.

11. The system of claim 9, wherein the first ad configuration includes a first combination of ad units, and the second ad configuration includes a second combination of ad units.

12. The system of claim 9, wherein the first ad configuration includes a rich media ad unit, and the second ad configuration includes a non-rich media ad unit.

13. The system of claim 9, wherein the publisher web page is configured to display advertising in either the first ad configuration or the second ad configuration each time it is displayed on a web browser.

14. The system of claim 9, wherein the bids to serve ads in the first ad configuration are received in combination with a first bid price, and the bids to serve ads in the second ad configuration are received in combination with a second bid price.

15. The system of claim 14, wherein the operations further include:
calculating a first aggregate revenue amount based on the first bid price; and
calculating a second aggregate revenue amount based on the second bid price.

16. A computer-readable medium storing instructions that, when executed by a processor of an advertising network server, cause the processor to perform operations including:

receiving, over a computer network, a plurality of ad requests from a processor of a publisher server, the plurality of ad requests including variables for serving online ads on a publisher web page, the variables including (i) one or more of: a geographic region, an advertising publication, a publication type, a browser type, and a temporal parameter, and (ii) at least a first ad configuration and a second ad configuration, wherein the first ad configuration is associated with a sub-region of the publisher web page and defines a first ad unit of a first pixel size, wherein the second ad configuration is also associated with and is coextensive over the sub-region of the publisher web page, wherein the second ad configuration is different from the first ad configuration, wherein the second ad configuration defines each of a second ad unit and a third ad unit of a second pixel size, wherein the first pixel size is different from the second pixel size, each of the first ad configuration and the second ad configuration defining an ad attribute;

receiving, over the computer network, a plurality of ad bids from a processor of an advertiser server, the plurality of ad bids including bids to serve ads in the first ad configuration and bids to serve ads in the second ad configuration, each of the plurality of ad bids including target variables, the target variables including one or more ad configurations, one or more cell sizes, and one or more of the variables for serving online ads on the publisher web page;

matching the plurality of ad requests to the plurality of ad bids based on the variables of the plurality of ad requests and the target variables to identify a portion of the plurality of ad bids that satisfies the variables of the plurality of ad requests;

determining a bid price for each ad associated with of the portion of the plurality of ad bids;

generating a table that lists ads associated with the portion of the plurality of ad bids in descending order based on the respective determined bid price;

determining, based on the generated table, which of the which of the ad bids, of the portion of the plurality of ad bids, maximize yield by applying one or more control parameters; and selecting one or more ad bids, of the portion of the plurality of ad bids, to serve ads in the first ad configuration and to serve ads in the second ad configuration, based at least in part on the determination of the ad bids that maximize yield.

* * * * *